W. BIELICKE.
PHOTOGRAPHIC LENS.
APPLICATION FILED JULY 1, 1912.
1,073,950.   Patented Sept. 23, 1913.
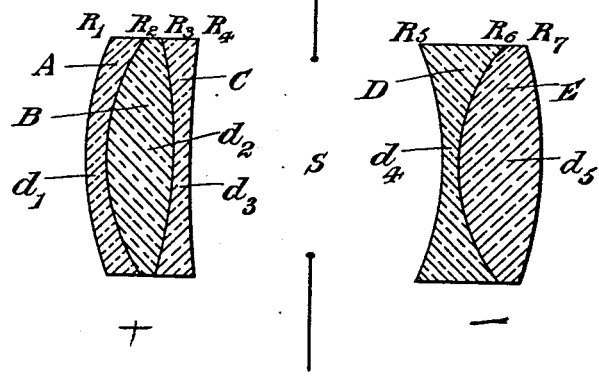
WITNESSES
INVENTOR
WILLIAM BIELICKE

UNITED STATES PATENT OFFICE.

WILLIAM BIELICKE, OF CLAPHAM COMMON, LONDON, ENGLAND, ASSIGNOR TO ROSS LIMITED, OF CLAPHAM COMMON, ENGLAND.

PHOTOGRAPHIC LENS.

1,073,950.  Specification of Letters Patent.  Patented Sept. 23, 1913.

Application filed July 1, 1912. Serial No. 706,955.

*To all whom it may concern:*

Be it known that I, WILLIAM BIELICKE, a subject of the German Emperor, of 3 North Side, Clapham Common, in the county of London, England, have invented new and useful Improvements in Connection with Photographic Lenses, of which the following is a specification.

This invention relates to photographic lenses composed of a front positive combination and a back negative combination, such as are known as telephoto lenses. The said lenses have the image distance, that is the distance from the last glass surface to the ground glass, or film, short as compared with the equivalent focus of the lens. There are two kinds of telephoto lenses known, one being composed of a positive combination constituting a perfectly corrected photographic objective, and a negative combination corrected for spherical and chromatic aberration, and the other kind being composed of a positive combination and a negative combination which are not corrected individually for the different aberrations, the aberrations in the compound lens being brought to a minimum by giving to the aberration of the positive combination algebraical signs opposite to those of the negative combination. Both these kinds of telephoto lenses have the focal length of the positive combination longer to a greater, or lesser, extent (even approaching equality) than the focal length of the negative combination. The negative aberrations in the negative combination are therefore considerable and it is necessary to give the positive combination a considerable positive aberration, which causes large spherical zonal aberrations making the lenses unsuited for large apertures.

According to the present invention the correction is obtained in the following manner: I regard the compound lens as one optical system, which has been corrected in the same manner as any other photographic objective, the best results being obtained when the focus of the negative combination is longer than that of the positive combination. The negative combination can therefore be made with very shallow curves which do not cause large negative aberrations and the positive combination can also be made with shallow curves, as the necessary amount of positive aberrations is not very great. I make the positive combination of three component lenses cemented together, two of these having a negative power and inclosing a lens of positive power, one of the contact surfaces having its convexity and the other its concavity presented toward the incident rays of light, and I make the negative combination of a double concave lens cemented to a double convex lens with its surface which is in contact with the double concave lens presented toward the incident rays of light. On this surface the difference of the indices of refraction should be as great as possible and preferably not less than 0.09.

The accompanying drawing is a diagram representing in section a compound lens constructed according to this invention, having the following data of construction for a focal length of 305 millimeters and an aperture of f/6.8. All curvatures which are convex toward the incident light are positive.

| Radii of curvatures. | Thicknesses of lenses and distances of separation. |
|---|---|
| $R_1 + 63.0$ | $d_1$ 4.5 |
| $R_2 + 42.8$ | $d_2$ 13.4 |
| $R_3 - 107.0$ | $d_3$ 3.6 |
| $R_4 + 282.4$ | $s$ 50.2 |
| $R_5 - 59.5$ | $d_4$ 3.6 |
| $R_6 + 39.2$ | $d_5$ 16.0 |
| $R_7 - 92.3$ | |

INDICES OF REFRACTION.

| | D line. | $G^1$ line. | $\nu$. |
|---|---|---|---|
| Lens A: | 1.6124 | 1.6343 | 37.0 |
| " B: | 1.5733 | 1.5860 | 57.5 |
| " C: | 1.5781 | 1.5966 | 41.0 |
| " D: | 1.6118 | 1.6256 | 56.8 |
| " E: | 1.5202 | 1.5333 | 51.3 |

Focal length of front lens +142.4 millimeters.

Focal length of back lens −160.6 millimeters.

Having now particularly described and ascertained the nature of my said invention and in what manner the same is to be performed, I declare that what I claim is:—

1. A photographic lens of the telephoto type, the said lens being composed of a positive front combination and a negative back combination of a focal length longer than the focal length of the positive combination both combinations including contact surfaces of negative power, for the purpose described.

2. A photographic lens of the telephoto type, the said lens being composed of a positive front combination and a negative back combination of a focal length longer than the focal length of the positive combination, the positive combination consisting of three component lenses, two of negative power inclosing one of positive power, one of the surfaces separating the lens of positive power from that of negative power having its convexity, and the other having its concavity, presented toward the incident rays of light, the negative combination being composed of a double concave lens and a double convex lens with its surface which is in contact with the double concave lens presented toward the incident rays of light, the difference of refraction on this surface being as great as possible as hereinbefore explained.

In testimony whereof I have signed my name to this specification in the presence of two subscribing witnesses.

WILLIAM BIELICKE.

Witnesses:
GILBERT FLETCHER TYSON,
WILLIAM GERALD REYNOLDS.

Copies of this patent may be obtained for five cents each, by addressing the "Commissioner of Patents, Washington, D. C."